United States Patent [19]
Bass et al.

[11] Patent Number: 6,029,155
[45] Date of Patent: Feb. 22, 2000

[54] CONFIGURABLE PERIPHERAL MANAGEMENT SYSTEM

[75] Inventors: Edward R. Bass, Trumbull; Robert L. Davis, New Canaan; Konstantin G. Kodonas, Norwalk; George T. Monroe, Seymour, all of Conn.

[73] Assignee: Pitney Bowes Inc., Stamford, Conn.

[21] Appl. No.: 08/887,439

[22] Filed: Jul. 2, 1997

[51] Int. Cl.⁷ ................................................. G06F 17/00
[52] U.S. Cl. ............................................................. 705/401
[58] Field of Search ..................................... 705/401, 407, 705/410, 414, 416, 17, 18, 20, 21, 23; 395/183.13, 183.14, 183.15; 713/1, 100

[56] References Cited

U.S. PATENT DOCUMENTS

| | | | |
|---|---|---|---|
| 4,084,242 | 4/1978 | Conti | 705/407 |
| 4,122,532 | 10/1978 | Dlugos et al. | 705/409 |
| 4,135,662 | 1/1979 | Dlugos | 705/407 |
| 4,271,470 | 6/1981 | Dlugos et al. | 705/407 |
| 4,410,961 | 10/1983 | Dlugos et al. | 705/410 |
| 4,410,962 | 10/1983 | Daniels et al. | 705/410 |
| 4,466,079 | 8/1984 | Daniels et al. | 705/407 |
| 5,195,130 | 3/1993 | Weiss et al. | 379/93.19 |
| 5,524,269 | 6/1996 | Hamilton et al. | 710/9 |
| 5,537,343 | 7/1996 | Kikinis et al. | 361/687 |
| 5,572,683 | 11/1996 | Epolite et al. | 710/704 |
| 5,715,164 | 2/1998 | Liechti et al. | 705/410 |
| 5,812,668 | 9/1998 | Weber | 705/21 |

*Primary Examiner*—Emanuel Todd Voeltz
*Assistant Examiner*—Thomas A. Dixon
*Attorney, Agent, or Firm*—Robert E. Meyer; Michael E. Melton

[57] ABSTRACT

A configurable peripheral management system includes a peripheral management device which comprises a microprocessor for executing peripheral management instructions stored in a persistent memory for performing operations such as polling a peripheral device. The peripheral management device is coupled to a host computer over a serial line, through which new peripheral management instructions can be downloaded for storage in the persistent memory.

29 Claims, 4 Drawing Sheets

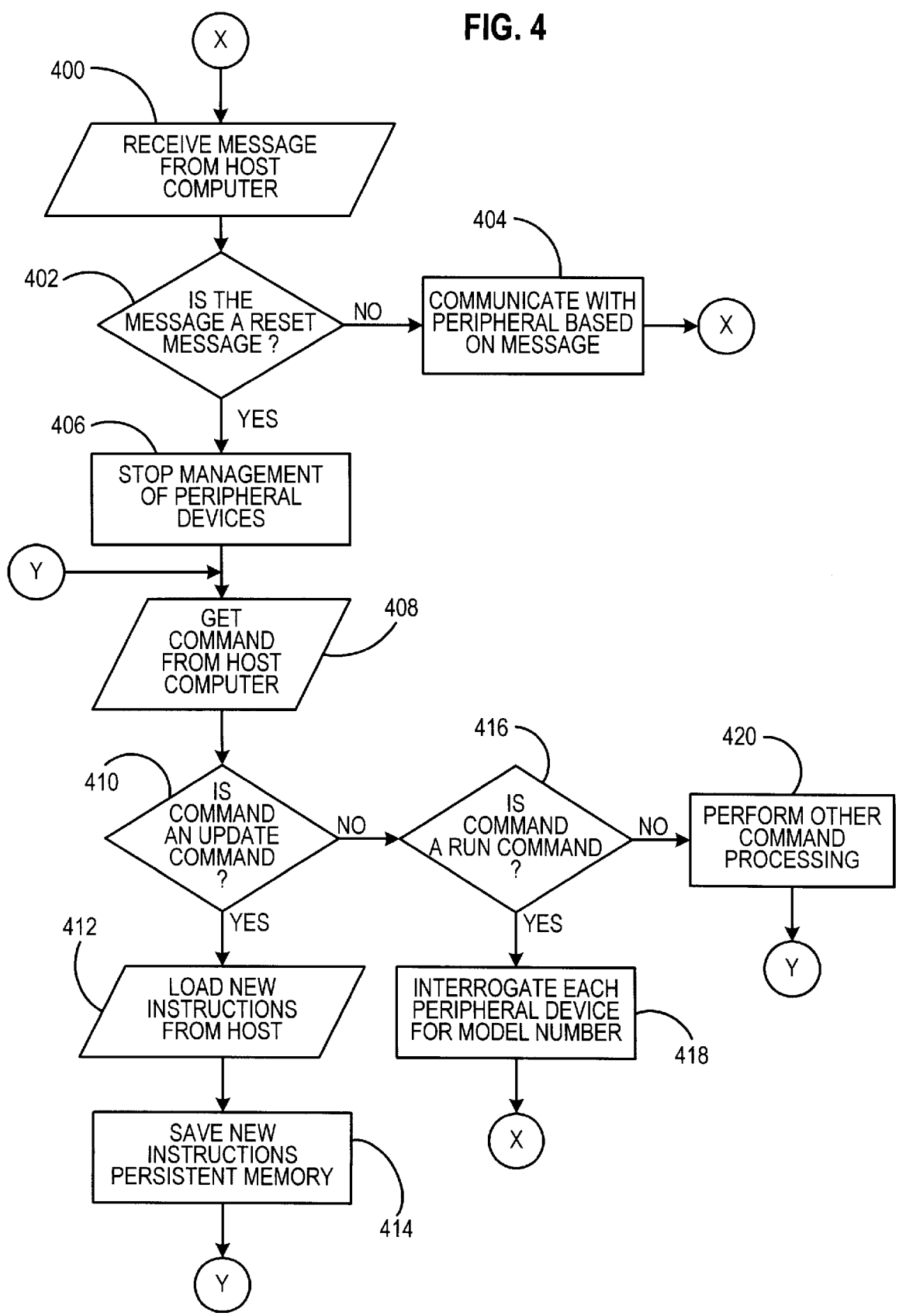

CONFIGURABLE PERIPHERAL MANAGEMENT SYSTEM

TECHNICAL FIELD

The invention relates to computer systems and, more particularly, to an apparatus and method for managing peripheral devices within a computer system.

BACKGROUND OF THE INVENTION

Computer systems often include peripheral devices connected to a host computer for performing various specialized functions. For example, many personal computer systems include a printer as a peripheral device for printing documents. Peripheral devices are connected to a host computer by an interface using a communications protocol. For instance, the printer peripheral device is typically connected to a personal computer system via a parallel interface. Other peripheral devices, such as modems, may be connected to a host computer via other interfaces, such as a serial interface.

Computer systems that include specialized peripheral devices for processing parcels, letters, and other types of mail are referred to as parcel processing systems. Typically, a parcel processing system includes a scale for weighing letters and parcels. Specialized printers, such as label printers and sheet printers, may be included. Other parcel processing systems include peripherals for providing metered postage, generally called postal meters.

There are many drawbacks in managing the specialized peripheral devices in conventional parcel processing systems. For example, these specialized peripheral devices often use specialized and proprietary interfaces for communication with a computer system. Thus, serial and parallel ports, which are industry-standard peripheral interfaces, do not work with these specialized peripheral devices.

A conventional approach for handling the non-standard interfaces of peripheral devices is to design and manufacture an interface card for plugging into the bus of a host computer for communication with the peripheral device. However, these interface cards are difficult to plug in and configure properly, often requiring the added expense of a service call by a computer technician. If the interface card is not properly configured, the peripheral device may mis-operate, causing customer dissatisfaction.

The costs associated with installing and configuring interface cards are incurred again when new peripheral devices are added to the parcel processing system. A new interface card may need to be designed, manufactured and shipped to the customer site, at which the old interface card is unplugged from the bus and replaced by the new interface card.

Another drawback in conventionally interfacing to peripheral devices is particularly acute when the host computer uses a windowing operating system. Typically, windowing operating systems are event-driven, in that applications running on top of the windowing operating system respond asynchronously to events that occur within the computer system. Many peripheral devices do not produce events that can be used by windowing operating systems; thus, a conventional approach is to write application software that polls the peripheral device for changes in state.

Another reason why application software for polling peripheral devices may need to be written is for keeping track of peripheral device usage. For example, in a parcel processing system, a postal meter peripheral device may include a feature for manual tripping, that is, a user can "trip" the meter to apply postage without going through the application software on the host computer of the system controlling the postal meter. Accordingly, accounting functions of the parcel processing system need to detect when a manual tripping of the postal meter has occurred. One approach to detecting a manual tripping is by using application software that polls the postal meter.

Polling the peripheral device in the application software, however, creates difficulties in many operating systems. Thus, application software or operating system software must be carefully written to periodically relinquish control back to the operating system or else the entire computer system would "hang." However, periodically interrupting the polling to perform other tasks reduces the real-time feedback and responsiveness of the host computer to the peripheral device.

SUMMARY OF THE INVENTION

There exists a need to reduce the installation costs and difficulties associated with interfacing specialized peripheral devices in computer systems. There is also a need for reducing the costs and drawbacks in adding or upgrading new peripheral devices to a computer system. Furthermore, there is a need for polling peripheral devices for changes in their state without impeding event-driven operating system software of many computer systems.

These and other needs are met by the present invention, which provides a peripheral management device that includes a microprocessor and a persistent memory. The peripheral management device is configured to connect to a computer system via an industry-standard, preferably serial interface. The peripheral device includes a microprocessor and a persistent memory for executing peripheral management instructions for polling peripheral devices and producing event messages that indicate changes in the state of the peripheral devices. New peripheral management instructions can be downloaded from the computer system into the persistent memory, for reducing upgrade costs.

According to one aspect of the invention, a peripheral management device comprises a serial interface for connection to a processing device, such as a personal computer, minicomputer, or mainframe computer, and a peripheral port for connection to a peripheral device, such as a weighing platform, a printer, a scanner, a postal scale, or other such device. Use of a serial interface to the host processing device and coupling one or more peripheral devices to the peripheral management device enables installation to be accomplished by merely plugging cables, simplifying the installation of the peripheral device and reducing the need for a computer technician.

A microprocessor, which may be a central processing unit, a microcontroller or the like, is coupled to the serial interface and the peripheral port. A persistent memory, such as a FLASH-EPROM, battery-backed-up, non-volatile RAM memory, or any other writable memory capable of retaining information for specified period, is coupled to the microprocessor for storing peripheral management instructions and/or upgrading instructions. The instructions can be machine language instructions, microcode, or the like.

The peripheral management instructions, when executed by the microprocessor, direct the peripheral management device to detect a change in a state of a peripheral device. For example, the device might detect a weight change for a scale or a manual tripping of a postal meter. Upon detecting such a change, the peripheral management device transmits a message indicative of the change in the state of the peripheral device through the serial interface to the processing device. The upgrading instructions when executed direct the peripheral management device to load new peripheral management instructions through the serial interface and store them in the persistent memory. Adding new peripheral devices to a computer requires at most downloading new peripheral management instructions to the peripheral management device, not changing the hardware, such as changing conventional interface cards.

According to another aspect of the invention, a peripheral management device comprises a first coupler, for connection to a processing device and a second coupler for connection to a peripheral device. The first and second couplers can be, for example, a serial interface, parallel interface, echoplex interface, or bus interface over a variety of communications media, including but not limited to electrical signals over a conductor such as copper wire, twisted pair, or coaxial cable, optical signals over optical fibers, and radio frequency and infrared frequency signals through the atmosphere or space.

The peripheral management device further comprises a peripheral management subsystem coupled to the first and second couplers. The peripheral management device is configured to receive a command from the processing device to monitor the peripheral device, such as weight change on a scale or a manual tripping of a postal meter. In response, the peripheral management subsystem is configured to repeatedly inspect the peripheral device, for example by polling or by repeatedly reading registers on the peripheral device, for determining whether an event occurred. If an event did occur, the peripheral management subsystem is configured to formulate a message indicative of the event which occurred and transmit the message to the processing device. In this manner, the operation of polling a peripheral device is offloaded to the peripheral management device, which produces messages that suit event-driven operating systems.

Preferably, the peripheral management subsystem is configured by storing peripheral management instructions, for which new peripheral management instructions can be downloaded, in a persistent memory to be executed by a microprocessor. However, the peripheral management subsystem may be configured by other techniques known in the art, such as with a programmable gate array or sequential logic.

In another aspect of the invention, a computer system comprises a processing device, a peripheral device, and a peripheral management device, coupled to the processing device and the peripheral device, as herebefore described.

In yet another aspect of the invention, a parcel processing system includes a weighing platform, a printer, and a computer system all coupled to a peripheral management device, which includes a microprocessor and a persistent memory. The persistent memory stores software for execution by the microprocessor for managing communications, such as protocol translation and peripheral status polling, between the weighing platform, the printer, and the computer system. The persistent memory also stores software for loading new software from the computer system and storing the new software in the persistent memory. The parcel processing may further comprise a postal meter coupled to the peripheral management device.

Another aspect of the invention is a method of downloading new peripheral management instructions within a computer system that includes a computer and a peripheral management device. The peripheral management device has a microprocessor for executing peripheral management instructions stored in a persistent memory for detecting a change in state of a peripheral device, for example, a weight change for a weighing platform or a manual tripping of a postal meter, and transmitting a message indicative of the change in state to the computer. The method includes the steps of sending a reset signal, for example in a serial message, from the computer to the peripheral management device, which, in response, stops execution of the peripheral management instructions. When the execution of the peripheral management instructions is stopped, the new peripheral management instructions are transmitted from the computer to the peripheral management device and stored in the persistent memory.

Still another aspect of the invention is a computer readable medium, such as a floppy disk, flexible disk, hard disk, magnetic tape, any other magnetic medium, a CD-ROM, any other optical medium, a RAM, a PROM, an EPROM, a FLASH-EPROM, any other memory chip or cartridge, a carrier wave signal received via a network, over a modem, or as a radio-frequency or infrared signal, or any other medium which a computer can read. Sequences of instructions are stored on the computer readable medium for controlling a peripheral management device having a peripheral port for connection to a peripheral device and a coupler for connection to a processing device.

In particular, the sequences of instructions include sequences of instructions for detecting a change in state of the peripheral device, for example, a weight change for a weighing platform or a manual tripping of a postal meter, via the peripheral port and transmitting a message indicative of the change in the state to the processing device through the coupler. The sequences of instructions also include sequences of instructions for loading new peripheral management instructions through the coupler from the processing device and storing the new peripheral management instructions in a persistent memory.

In another aspect, a computer readable medium has sequences of instruction stored on it for a peripheral management device to receive a command from a processing device to monitor a peripheral device, and in response to repeatedly inspect the peripheral device for determining whether an event occurred. If an event did occur, a message indicative of the event which occurred is formulated and transmitted to the processing system. The computer readable medium may include sequences of instructions for loading new sequences of instructions from the processing device via the coupler and storing the new sequences of instructions in a persistent memory.

In still another aspect, a computer readable medium stores sequences of instructions for directing a processing device to download sequences of peripheral management instructions to a peripheral management device by sending a reset signal to the peripheral management device, then transmitting the sequences of peripheral management instructions to the peripheral management device, and then causing the peripheral management to execute the peripheral management instructions. Executing the peripheral management instructions cause the peripheral management device to detect a change in state of a peripheral device and transmit a message indicative of the change in state to the processing device.

In yet another aspect, a computer readable medium stores sequences of instructions for directing a peripheral management device to load new sequences of peripheral management instructions from a processing device by receiving a reset signal from the processing device, and in response, stopping execution of previous sequences of peripheral management instructions. After stopping the execution, the new sequences of peripheral management instructions are received and executed, causing the peripheral management device to detect a change in state of a peripheral device and transmit a message indicative of the change in state to the processing device.

Additional objects, advantages, and novel features of the present invention will be set form in part in the detailed description which follows, and in part will become apparent upon examination or may be learned by practice of the invention. The objects and advantages of the invention may be realized and obtained by means of the instrumentalities and combinations particularly pointed out in the appended claims.

BRIEF DESCRIPTION OF THE DRAWINGS

The present invention is illustrated by way of example and not by limitation, in the FIGS. of the accompanying drawings, wherein elements having the same reference numeral designations represent like elements throughout and wherein:

FIG. 4 is a flow chart illustrating the upgrading operation of a configurable, peripheral management device.

DETAILED DESCRIPTION OF THE PREFERRED EMBODIMENTS

A peripheral management device of a parcel processing system is described. In the following description, for purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

A PARCEL PROCESSING SYSTEM

Figure 1:
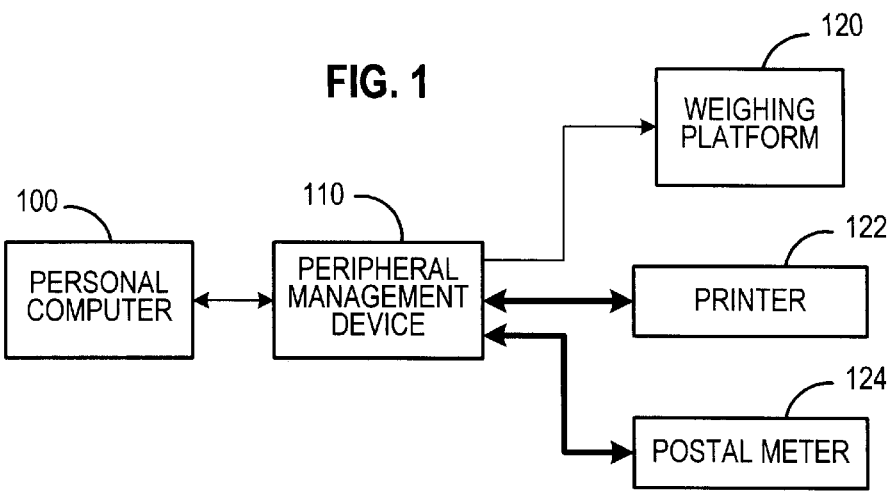
FIG. 1 is a high-level block diagram of a parcel processing system.

Referring to FIG. 1, a parcel processing system according to one embodiment of the invention is a computer system which comprises a host computer 100, which can be an industry-standard "IBM compatible" personal computer, workstation, minicomputer, or any other computer with a keyboard and monitor and possibly other input/output devices such as a mouse. Also included in the host computer 100 is a serial interface for connection to a peripheral management device 110.

Software executing on the host computer 100 provides a windowing, graphical user interface to the parcel processing system, as well as database management, bookkeeping, and reporting capabilities. For example, accounting routines in the software can keep track of how much postage has been used in the parcel processing system.

The peripheral management device 110 is coupled through peripheral ports to a variety of peripheral devices, such as a weighing platform 120 for weighing parcels, a printer 122 for printing forms or parcel labels, and optionally a postal meter 124 for electronically applying postage. Each peripheral device may be coupled through a different kind of peripheral port, which requires a particular protocol. For example, the weighing platform 120 may be coupled to the peripheral management device 110 through a serial port, but the printer 122 through a parallel port. Finally, a postal meter 124 may require a connection through an "echoplex" port, using a protocol which is serial character asynchronous and bit synchronous, in message form, with the bits of the message being timed in accordance with a given schedule. The messages are returned or echoed by the recipient, bit by bit for checking. However, these protocols are not specific to these types of peripherals. For example, a sheet printer peripheral device produced by one manufacturer may use an echoplex port, while a postal meter model produced by another manufacturer may use a serial port. The peripheral management device 110 can handle a variety of peripheral devices through a variety of peripheral ports.

The peripheral management device 110 is responsible for managing communications between the peripheral devices coupled thereto and the host computer 100. In particular, the peripheral management device 110 receives generic, high-level requests and performs a series of low-level actions specific to the particular device, such as reading registers, with the proper protocol for the peripheral device. In the management of communications with peripheral devices, the peripheral management device 110 maintains an peripheral device identifier, such as a model number, which can be determined by interrogating the peripheral device or received from the host computer 100.

For example, an application executing on the host computer 110 (hereinafter the "host application") may make a request to peripheral management device 110 to determine how much weight is on the weighing platform 120. In this case, the peripheral management device 110 receives the request, and using the appropriate protocol as indicated by the weighing platform model number previously determined, reads a register on the weighing platform 120 that contains how much weight is disposed thereupon. Then, the peripheral management device 110 sends a message with that information back to the host application on the host computer 100 through the serial interface. Moreover, the peripheral management device 110 by means of maintaining the weighing platform model number is capable of distinguishing, for example, between weight readings according to the metric system (grams) or according to the U.S. customary system (ounces).

The peripheral management device 110 also performs additional functions, such as polling and automatic upgrading, as described hereafter.

AN EXTERNAL PERIPHERAL MANAGEMENT DEVICE

Figure 2A:
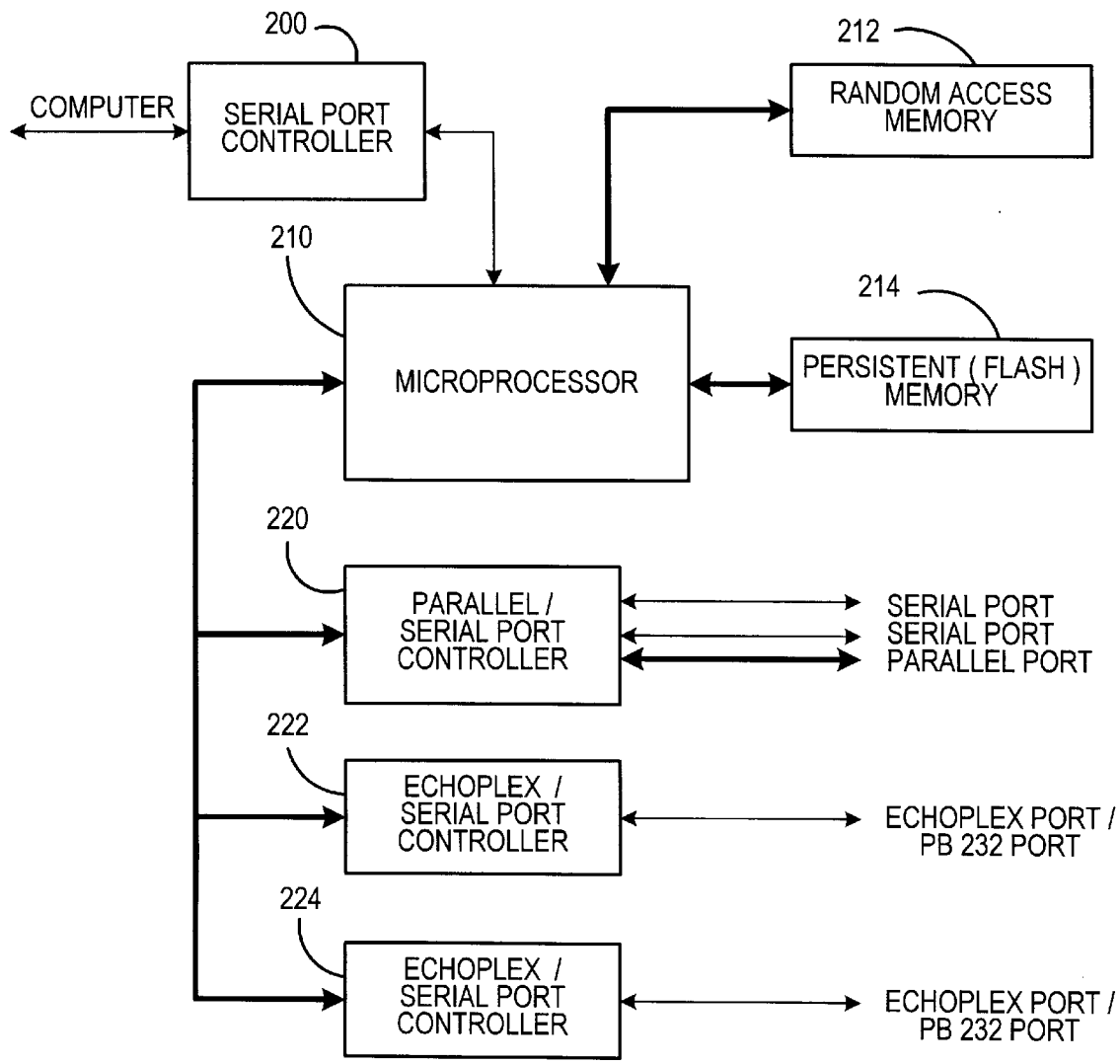
FIG. 2(a) is a block diagram of an external peripheral management device according to one embodiment.

According to one embodiment of the invention, a peripheral management device 110 is implemented as an external device which is coupled to the host computer 100 via a serial port, such as a COM port. Referring to FIG. 2(a), an external peripheral management device comprises a serial port controller 200 for transferring serial communications between the host computer 110 and microprocessor 210. Microprocessor 210, which is preferably a CMOS single-chip microprocessor for low power consumption, executes instructions stored in persistent memory 214 using random access memory (RAM) 212 as a work area for variables and other data. The actions performed by executing instructions stored in persistent memory 214 is described in more detail hereafter.

Persistent memory 214 is preferably a FLASH-EPROM, but may be implemented by other well-known components, for example, as a battery-backed-up RAM. In one embodiment, there is 256 KB of RAM 212 and 128 KB of persistent memory 214, both expandable to 512 KB. In fact, persistent memory 214 and RAM 212 are examples of computer readable media.

Microprocessor 210 is coupled to a number of peripheral port controllers: parallel/serial port controller 220 that controls two serial ports and a parallel port; and two echoplex PB232 controllers 222 and 224. It is contemplated that printer peripheral devices would be connected to the parallel port, and that postal meter peripheral devices would be connected to either the serial or the echoplex ports, while weighing platform peripheral devices would be connected to serial ports.

Since a serial interface is standard and easy to set up for many computer system, for example by simply plugging cables, using a serial interface reduces installation costs and the need for a service call by a trained service technician.

AN INTERNAL PERIPHERAL MANAGEMENT DEVICE

Figure 2B:
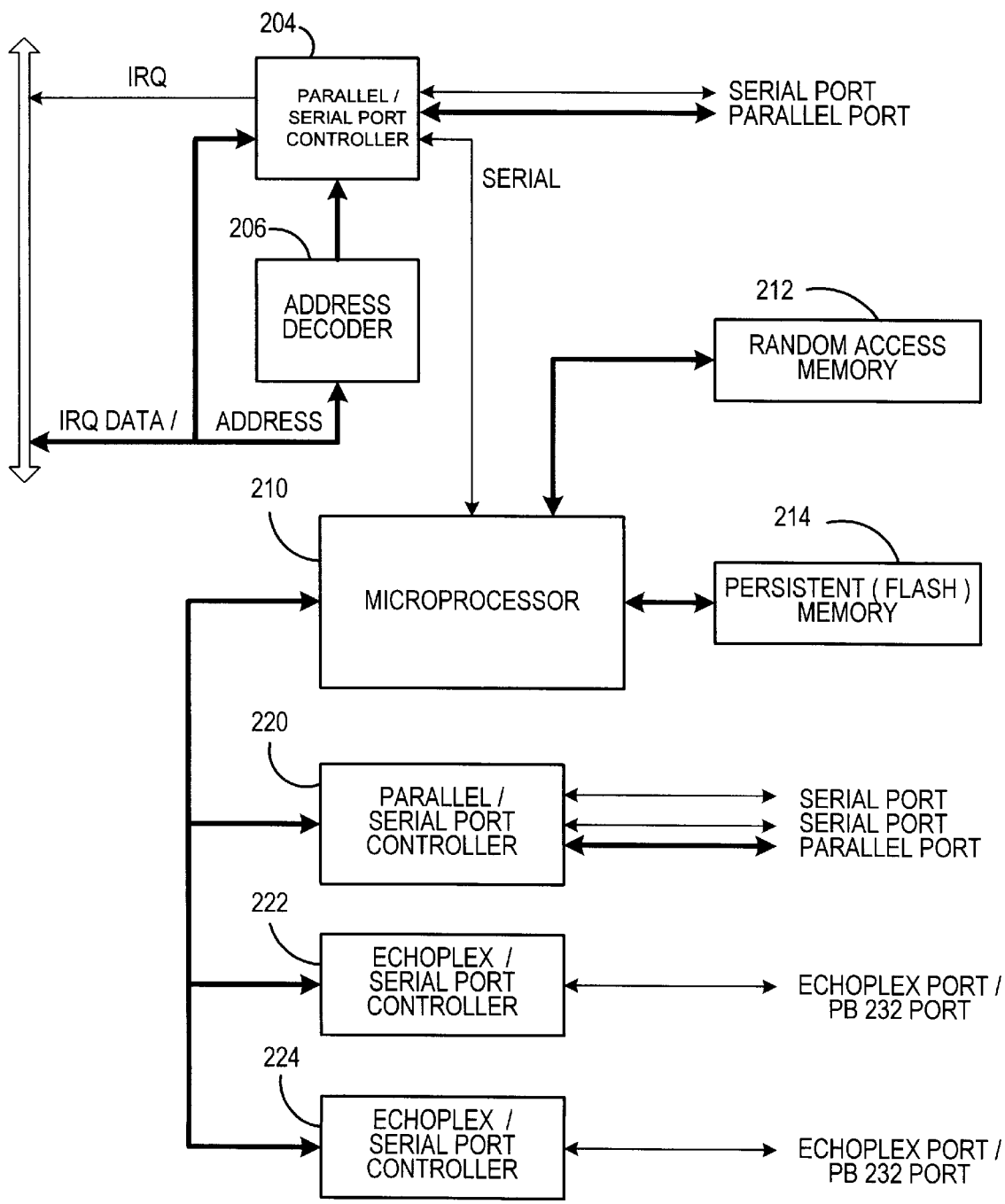
FIG. 2(b) is a block diagram of an internal peripheral management device according to another embodiment.

According to another embodiment of the invention, the peripheral management system 110 is implemented as an internal card which plugs into a bus of the host computer 110, preferably used in turnkey implementations, where there is great control over the configuration of the host computer 100. Referring to FIG. 2(b), an internal peripheral management system comprises a microprocessor 210, RAM 212, persistent memory 214, parallel/serial port controller 220, echoplex PB232 port controller 222, and echoplex PB232 port controller 224, coupled and configured as described herebefore in reference to the external device implementation.

Instead of the serial port controller 200 of FIG. 2(a), however, the internal implementation comprises a parallel/serial port controller 204 and address decoder 206, which are coupled to the bus of the host computer 110. Together, the port controller 204 and address decoder 206 are configured to transfer serial communications to microprocessor 210 based on a preset IRQ and address setting. Furthermore, the port controller 204 provides an additional serial port and parallel port for the host computer 100, needing only one serial interface to communicate with microprocessor 210.

By communicating serially with the microprocessor 210, much of the design of the external device can be reused for the internal card, saving engineering design and production costs. Moreover, the microprocessor 210 of both implementations are able to execute the same firmware, that is the peripheral management instructions stored in persistent memory 214, because the same serial communications interface is presented to microprocessor 210. In addition, the new firmware can be downloaded to upgrade the internal card without replacing it.

POLLING A PERIPHERAL DEVICE

Figure 3:
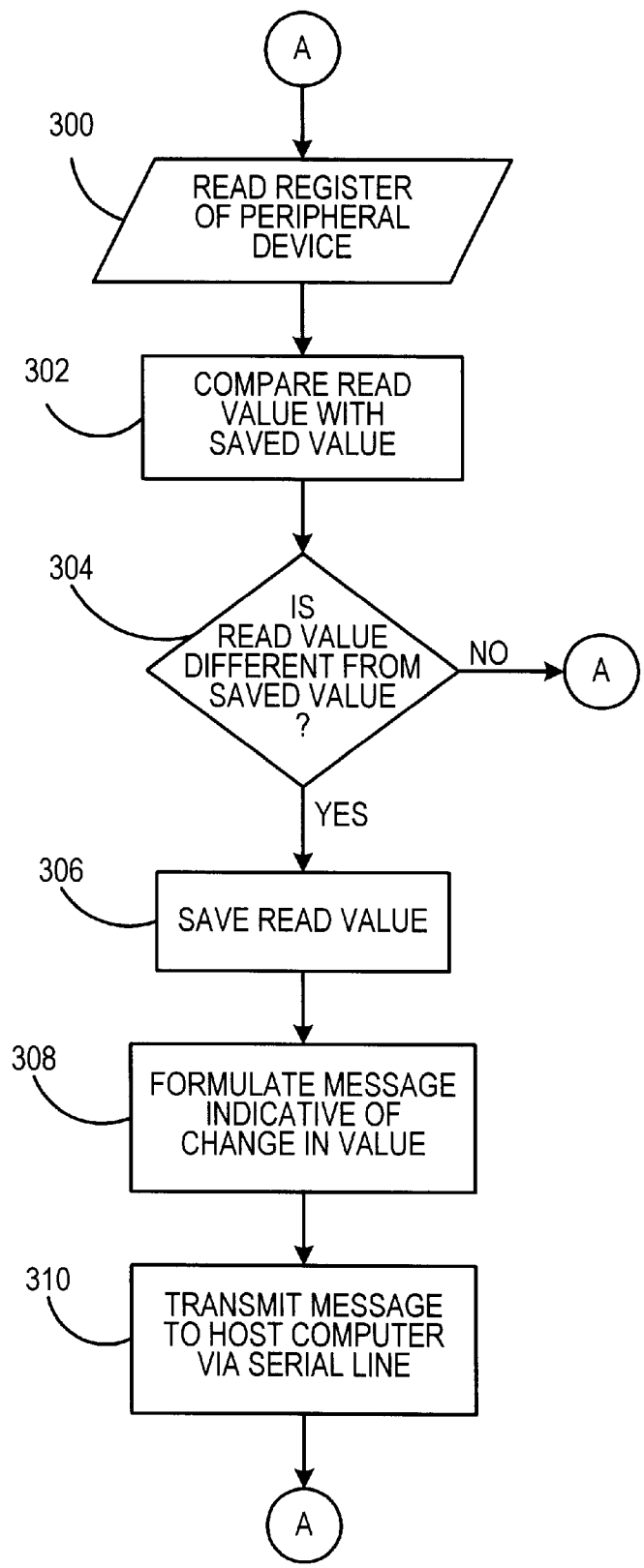
FIG. 3 is a flow chart illustrating the polling operation of a peripheral management device.

Since the peripheral management device 110 comprises a microprocessor 210 executing instructions stored in persistent memory 214, functions previously performed by the host computer 100, such as polling a peripheral device, can be advantageously offloaded to the peripheral management device 110. FIG. 3 is a flow chart that illustrates the operation of polling a peripheral device according to an embodiment of the invention.

At step 300, the peripheral management device 110 reads a value from registers or otherwise fetches state information (e.g., by passing messages) of a particular peripheral device, using an appropriate protocol determined in accordance with a maintained peripheral device identifier, such as model number. At step 302, the read value is compared to a previously saved value for the peripheral device, and decision step 304 is performed. If the read value is not different from the saved value, then execution loops back to step 300, causing the peripheral management device to repeatedly inspect the peripheral device for a change in state. Polling of other peripheral devices occurs in the same loop.

On the other hand, if the read value is different from the saved value, then execution branches to step 306 where the read value is saved for later comparison in step 304. At step 308, a message is formulated that is indicative of the change in value. The particular message that is formulated depends on the particular peripheral device, the read and saved values, and an operation requested by the host application.

For example, if the peripheral device is a weighing platform 120, a formulated message may indicate: that the weighing platform 120 went out of zero; that the weighing platform 120 went into zero; that the weight on the weighing platform 120 is unstable; that weight has changed; a differential weight, that is the weight between two weighings; and even piece counting, determined from the weight of a single parcel and a stack of parcels.

As a another example, a formulated message for a postal meter 124 can indicate that the customer has manually tripped the postal meter 124 so that the accounting software of the host application can properly track that expense. A formulated message for a printer 122, for yet another example, can indicate that the printer 122 is off line or out of paper. Included in the formulated message is a tag that is used by the host computer 100 to match up the message with a process or task of the host application software that requested notification about that change in state. At step 310, the formulated message is transmitted serially to host computer 100 as an "event message"; and execution loops back to step 300 for polling the peripheral device. When the event message is received by the host computer 100, a queue, associated with the tag, of registered application functions is inspected. An application function by the host application software has previously registered for a set of event message types with an event mask, and more than one application function can be registered for an event message type.

A process on the host computer 110 inspects the registration of each application function in the queue, determines if it had been registered for that event according to the event mask, and if so registered, invokes the application function consistent with the event-driven environment of the host application. In this manner, an application function can be invoked for a plurality of event message types, and an event message can invoke a plurality of application functions.

Thus, peripheral management device 110 performs the polling needed for detecting state changes in peripheral devices, and formulates event messages without interfering with an event-driven operating system on host computer 100.

UPGRADING THE PERIPHERAL MANAGEMENT DEVICE FIRMWARE

When new peripheral devices are developed and connected to a computer system, it is possible for the peripheral management device 110 to become obsolete over time with respect to the new peripheral device, unless the peripheral management device 110 is upgraded. Since the peripheral management instructions, which are responsible for peripheral management of the device, are stored in a writable, persistent memory 214, the peripheral management device 110 can easily be upgraded by loading new firmware for storage in the persistent memory 214.

A flow chart illustrating a method of downloading new peripheral management instructions to a peripheral management device 110 is depicted in FIG. 4. At step 400, the peripheral management device 110 receives a message from the host computer 100 in a normal processing loop for managing communications with coupled peripheral devices. If the message is not a reset message (step 402), then the normal communications with the peripheral device, such a polling a postal meter for how much postage is remaining or querying a weighing platform for how much weight is disposed thereon, is performed (step 404). After step 404 is performed, execution loops back to step 402.

On the other hand, if a reset message was received (step 402), step 406 is performed in which the normal peripheral device management functions are stopped and the peripheral management device 110 enters a reset state where step 408 is performed. At step 408, the peripheral management device 110 is in a reset state in which it accepts a small set of commands received from host computer 100.

If the received command is an UPDATE command (step 410), then execution proceeds to load (step 412) and store (step 414) new peripheral management instructions, preferably in 512-byte blocks, starting at a known address in the persistent memory 214. After the new peripheral management instructions are downloaded, execution loops back to step 408 in the reset state.

On the other hand, if the received command is not an UPDATE command (step 410), the command is checked to determine whether it is a RUN command (step 416). If the command is a RUN command, then each peripheral device is interrogated for its model number (step 418) and the normal processing loop is re-executed at step 400. On the other hand, if the command is not a RUN command, then other command processing is performed (step 420), possibly ignoring meaningless commands, and execution loops back to step 408 in the reset state.

In this manner, the peripheral management device 110 can be upgraded to handle new control strategies for upgraded or new peripheral devices, without having to replace any interface cards by a computer technician. Typically, the new peripheral management instructions are distributed to host computer 100 on a computer readable medium.

A computer readable medium is any article of manufacture which contains data that can be read by a computer or a carrier wave signal carrying data that can be read by a computer. For example new peripheral management instructions may be distributed on a magnetic media, such as a floppy disk, flexible disk, hard disk, reel-to-reel tape, cartridge tape, and cassette tapes; on optical media, such as a CD-ROM and writable compact disks; on paper media, such as punch cards and paper tape; on a carrier wave signal received through a network, wireless network, or modem, including radio-frequency signals and infrared signals.

The computer readable medium is input into the computer system, for example, by inserting a floppy disk into a disk drive or transmitting a signal to a modem on host computer 100. Software on the host computer 110 reads the computer readable medium and downloads the new firmware over the serial interface sending the messages, commands, and data as described hereinabove.

While the present invention has been described in connection with what is presently considered to be the most practical and preferred embodiments, it is to be understood that the invention is not limited to the disclosed embodiment, but, on the contrary, is intended to cover various modifications and equivalent arrangements included within the spirit and scope of the appended claims.

What is claimed is:

1. A peripheral management device, for managing one or more peripheral devices of varied type and wherein each one of said varied type may utilize a communication protocol that differs from each other of said varied type, said device comprising:

(a) a serial interface for connection to a processing device;

(b) a peripheral port for connection to a peripheral device;

(c) a microprocessor coupled to said serial interface and said peripheral port; and (d) a persistent memory coupled to said microprocessor for storing peripheral management instructions and upgrading instructions; wherein said peripheral management instructions, when executed by said microprocessor, direct said peripheral management device to perform the steps of:

(i) detecting a change in a state of the peripheral device via said peripheral port; and (ii) transmitting a message indicative of the change in the state of the peripheral device through said serial interface to the processing device; and wherein said upgrading instructions when executed by said microprocessor, direct said peripheral management device to perform the steps of:

(1) loading new peripheral management instructions through said serial interface from the processing device; and (2) storing the new peripheral management instructions in said persistent memory.

2. The peripheral management device of claim 1, wherein said peripheral management instructions comprise weighing platform management instructions, which when executed by said microprocessor direct the peripheral management device to detect a weight change occurring for a weighing platform coupled to said peripheral port, and transmit a message indicative of the weight change through said serial interface.

3. The peripheral management device of claim 1, wherein said peripheral management instructions comprise postal meter management instructions, which when executed by said microprocessor direct the peripheral management device to:

(a) detect a manual tripping of a postal meter coupled to said peripheral port, and (b) transmit a message indicative of the manual tripping of the postal meter through said serial interface.

4. A peripheral management device, comprising:

(a) a first coupler for connection to a processing device;

(b) a second coupler for connection to a peripheral device;

(c) a peripheral management subsystem coupled to said first coupler and said second coupler and configured to receive a command from the processing device to monitor the peripheral device; in response, to repeatedly inspect the peripheral device for determining whether an event occurred; and, if an event occurred, to formulate a message indicative of the event which occurred and transmit the message to the processing device.

5. The peripheral management device of claim 4, wherein said peripheral management subsystem comprises:

(a) a microprocessor coupled to said first coupler and said second coupler; and (b) a persistent memory coupled to said microprocessor for storing peripheral management instructions, wherein said peripheral management instructions, when executed by said microprocessor, direct said peripheral management subsystem to perform the steps of:
  (i) receiving the command from the processing device to monitor the peripheral device; and, in response,
  (ii) repeatedly inspecting the peripheral device for determining whether an event occurred; and if an event occurred, formulating a message indicative of the event which occurred and transmitting the message to the processing device.

6. The peripheral interface device of claim 5, wherein said peripheral management subsystem is further configured to load new peripheral management instructions from said first coupler and store the new peripheral management instructions in said persistent memory.

7. The peripheral management device of claim 4, wherein said peripheral management subsystem is configured to detect a weight change occurring for a weighing platform coupled to said second coupler and transmit a message indicative of the weight change through said first coupler.

8. The peripheral management device of claim 4, wherein said peripheral management subsystem is configured to detect a manual tripping of a postal meter coupled to said second coupler and transmit a message indicative of the manual tripping of the postal meter through said second coupler.

9. A computer system, comprising:
(a) a processing device;
(b) a peripheral device; and
(c) a peripheral management device coupled to said processing device and said peripheral device, further including:
  (i) a microprocessor coupled to said processing device and said peripheral device, and
  (ii) a persistent memory coupled to said microprocessor for storing peripheral management instructions and upgrading instructions; wherein the peripheral management instructions, when executed by said microprocessor, direct said peripheral management device to perform the steps of:
    (1) detecting a change in a state of the peripheral device; and
    (2) transmitting a message indicative of the change in the state of the peripheral device to the processing device; and wherein the upgrading instructions, when executed by said microprocessor, direct said peripheral management device to perform the steps of:
      (i) loading new peripheral management instructions from the processing device; and
      (ii) storing the new peripheral management instructions in said persistent memory.

10. The computer system of claim 9, wherein:
(a) said peripheral device comprises a weighing platform; and
(b) said peripheral management instructions comprise weighing platform management instructions, which when executed by said microprocessor direct the peripheral management device to:
  (i) detect a weight change occurring for a weighing platform coupled to said peripheral port, and
  (ii) transmit a message indicative of the weight change through said serial interface.

11. The peripheral management device of claim 9, wherein: said peripheral device comprises a postal meter; and said peripheral management instructions comprise postal meter management instructions, which when executed by said microprocessor direct the peripheral management device to:
  (a) detect a manual tripping of a postal meter coupled to said peripheral port, and
  (b) transmit a message indicative of the manual tripping of the postal meter through said serial interface.

12. A computer system, comprising:
(a) a processing device;
(b) a peripheral device;
(c) a peripheral management subsystem coupled to said processing device and said peripheral device and configured to receive a command from said processing device to monitor said peripheral device; in response, to repeatedly inspect said peripheral device for determining whether an event occurred; and if an event occurred, to formulate a message indicative of the event which occurred and transmit the message to said processing device.

13. The computer system of claim 12, wherein said peripheral management subsystem comprises:
(a) a microprocessor coupled to said processing device and said peripheral device; and
(b) a persistent memory coupled to said microprocessor for storing peripheral management instructions, wherein said peripheral management instructions, when executed by said microprocessor, direct said microprocessor to perform the steps of:
  (i) receiving the command from said processing device to monitor said peripheral device;
  (ii) in response, repeatedly inspecting said peripheral device for determining whether an event occurred; and if an event occurred, formulating a message indicative of the event which occurred and transmitting the message to said processing device.

14. The computer system of claim 13, wherein said peripheral management subsystem is further configured to load new peripheral management instructions from said first coupler and store the new peripheral management instructions in said persistent memory.

15. The computer system of claim 12, wherein said peripheral device includes a weighing platform; and said peripheral management subsystem is configured to detect a weight change occurring for said weighing platform and transmit a message indicative of the weight change to said processing device.

16. The computer system of claim 12, wherein said peripheral device comprises a postal meter; and said peripheral management subsystem is configured to detect a manual tripping of said postal meter and transmit a message indicative of the manual tripping of said postal meter to said processing device.

17. A parcel processing system, comprising:
(a) a computer system;
(b) a weighing platform for weighing parcels;
(c) a printer; and
(d) a peripheral management device coupled to said computer system, said weighing platform, and said printer, said peripheral management device comprising:
  (i) a microprocessor; and
  (ii) a persistent memory for storing software, which when executed by said microprocessor directs said peripheral management device to manage communications between said computer system, said weighing platform, and said printer and to load new software from said computer system and store the new software in said persistent memory.

18. The parcel processing system of claim 17, wherein at least some of the software in said persistent memory directs the peripheral management device to receive a command from said computer system to monitor said weighing platform for a change in weight; in response, to repeatedly inspect said scale for determining whether the change in weight occurred; and if the change in weight occurred, to formulate a message indicative of the change in weight and transmit the message to the computer device.

19. The parcel processing system of claim 17, wherein at least some of the software in said persistent memory directs said peripheral management device to ascertain a model type of said weighing platform.

20. The parcel processing system of claim 17, further comprising a postal meter coupled to said peripheral management device, wherein at least some of the software in said persistent memory directs said peripheral management device to manage communications between said computer system and said postal meter.

21. A method of downloading new peripheral management instructions from a computer to a peripheral management device coupled thereto having a microprocessor for executing peripheral management instructions stored in a persistent memory for detecting a change in state for a peripheral coupled to the peripheral management device and transmitting a message indicative of the change in state to the computer, said method comprising the steps of:
 (a) sending a reset signal from the computer to the peripheral management device;
 (b) in response to receiving the reset signal, stopping execution of the peripheral management instructions; and
 (c) when the execution of the peripheral management instructions has stopped, performing the steps of:
  (i) transmitting the new peripheral management instructions from the computer to the peripheral management device, and
  (ii) storing the new peripheral management instructions in the persistent memory.

22. The method of claim 21, further comprising the step of causing the microprocessor to execute at least some of the new peripheral management instructions after storing the new peripheral management instructions in the persistent memory.

23. A computer readable medium having sequences of instructions stored thereon for controlling a peripheral management device having a coupler for connection to a processing device, a peripheral port for connection to a peripheral device, and a processor for executing instructions, said sequences of instructions comprising sequences of instructions for performing the steps of:
 (a) detecting a change in a state of the peripheral device via the peripheral port;
 (b) transmitting a message indicative of the change in the state of the peripheral device through the coupler to the processing device;
 (c) loading new peripheral management instructions through the coupler from the processing device; and
 (d) storing the new peripheral management instructions.

24. The computer readable medium of claim 23, wherein the step of detecting includes the step of detecting a weight change of a weighing platform via the peripheral port; and the step of transmitting includes the step of transmitting a message indicative of the weight change to the processing device.

25. The computer readable medium of claim 23, wherein said detecting step further comprises the step of detecting a manual tripping of a postal meter via the peripheral port; and wherein said transmitting step includes the step of transmitting a message indicative of the manual tripping to the processing device.

26. A computer readable medium having sequences of instructions stored thereon for controlling a peripheral management device having a coupler for connection to a processing device, a peripheral port for connection to a peripheral device, and a processor for executing instructions, said sequences of instructions comprising sequences of instructions for performing the steps of:
 (a) receiving a command from the processing device to monitor the peripheral device;
 (b) in response, repeatedly inspecting the peripheral device for determining whether an event occurred; and
 (c) if an event occurred, formulating a message indicative of the event which occurred and transmitting the message to the processing device.

27. The computer readable medium of claim 26, wherein said sequences of instructions further comprise sequences of instructions for performing the step of loading new sequences of instructions from the processing device via the coupler and storing the new sequences of instructions.

28. A computer readable medium having sequences of instructions stored thereon for directing a processing device to download sequences of peripheral management instructions to a peripheral management device from a processing device, said sequences of instructions comprising sequences of instructions for performing the steps of:
 (a) sending a reset signal to the peripheral management device;
 (b) after sending the reset signal, transmitting the sequences of peripheral management instructions to the peripheral device;
 (c) and after transmitting the sequences of peripheral management instructions, causing the peripheral device to execute the sequences of peripheral management instructions, whereby the peripheral management device detects a change in state of a peripheral device coupled thereto and transmits a message indicative of the change in state to the processing device.

29. A computer readable medium having sequences of instructions stored thereon for directing a peripheral management device to load sequences of new peripheral management instructions from a processing device, said sequences of instructions comprising sequences of instructions for performing the steps of:
 (a) receiving a reset signal from the processing device;
 (b) in response to receiving the reset signal, stopping execution of previous sequences of peripheral management instructions;
 (c) when the execution of the previous sequences of peripheral management instructions has stopped, receiving the new sequences of peripheral management instructions from the processing device; and
 (d) executing the new sequences of peripheral management instructions, whereby the peripheral management device detects a change in state of a peripheral device coupled thereto and transmits a message indicative of the change in state to the processing device.

* * * * *